United States Patent
Miller et al.

(10) Patent No.: US 7,417,333 B2
(45) Date of Patent: Aug. 26, 2008

(54) METHODS AND APPARATUS FOR CONTROLLING CURRENT IN AN ELECTRICAL MACHINE

(75) Inventors: Nicholas Wright Miller, Delmar, NY (US); Einar Larsen, Charlton, NY (US); Robert William Delmerico, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 113 days.

(21) Appl. No.: 11/555,987

(22) Filed: Nov. 2, 2006

(65) Prior Publication Data

US 2008/0106098 A1 May 8, 2008

(51) Int. Cl.
*H02P 9/00* (2006.01)
*F03D 7/00* (2006.01)

(52) U.S. Cl. .............. 290/44; 322/27; 322/37; 290/7

(58) Field of Classification Search .......... 290/44, 290/55, 7; 322/25, 27, 28, 37
See application file for complete search history.

(56) References Cited

U.S. PATENT DOCUMENTS

| | | | |
|---|---|---|---|
| 3,959,719 A | 5/1976 | Espelage | |
| 3,959,720 A | 5/1976 | Bose et al. | |
| 3,982,167 A | 9/1976 | Espelage | |
| 3,982,168 A | 9/1976 | Bose et al. | |
| 4,400,659 A * | 8/1983 | Barron et al. .......... 322/32 |
| 4,677,364 A * | 6/1987 | Williams et al. ........ 322/47 |
| 5,083,039 A | 1/1992 | Richardson et al. | |
| 5,168,208 A * | 12/1992 | Schultz et al. ......... 322/25 |
| 5,225,712 A * | 7/1993 | Erdman .............. 290/44 |
| 5,264,778 A * | 11/1993 | Kimmel et al. ......... 322/25 |
| 5,798,631 A | 8/1998 | Spee et al. | |
| 6,281,601 B1 * | 8/2001 | Edelman et al. ........ 307/29 |
| 6,329,798 B1 | 12/2001 | Huggett et al. | |
| 6,380,719 B2 * | 4/2002 | Underwood et al. ..... 322/36 |
| 6,856,040 B2 | 2/2005 | Feddersen et al. | |
| 6,933,625 B2 | 8/2005 | Feddersen et al. | |
| 7,015,595 B2 | 3/2006 | Feddersen et al. | |
| 7,015,597 B2 | 3/2006 | Colby et al. | |
| 7,095,128 B2 * | 8/2006 | Canini et al. .......... 290/44 |
| 7,166,928 B2 * | 1/2007 | Larsen ............... 290/55 |
| 7,239,036 B2 * | 7/2007 | D'Atre et al. ......... 290/44 |
| 7,312,537 B1 * | 12/2007 | Walling ............. 290/44 |

* cited by examiner

*Primary Examiner*—Nicholas Ponomarenko
(74) *Attorney, Agent, or Firm*—Armstrong Teasdale LLP

(57) ABSTRACT

A method for determining electric currents for an electrical machine includes generating a first real power current demand signal and a first reactive power current demand signal. The method also includes determining at least one of a second real power current demand signal and a second reactive power current demand signal by prioritizing a second real power current demand signal over a second reactive power current demand signal. Alternatively, the method also includes determining at least one of a second real power current demand signal and a second reactive power current demand signal by prioritizing the second reactive power current demand signal over the second real power current demand signal. The method further includes comparing at least one of the first real power current demand signal and first reactive power current demand signal to at least one electrical machine current limit signal.

20 Claims, 6 Drawing Sheets

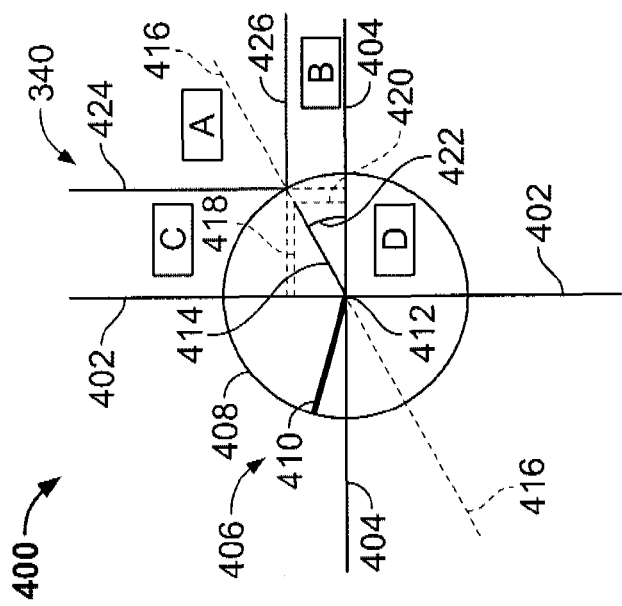
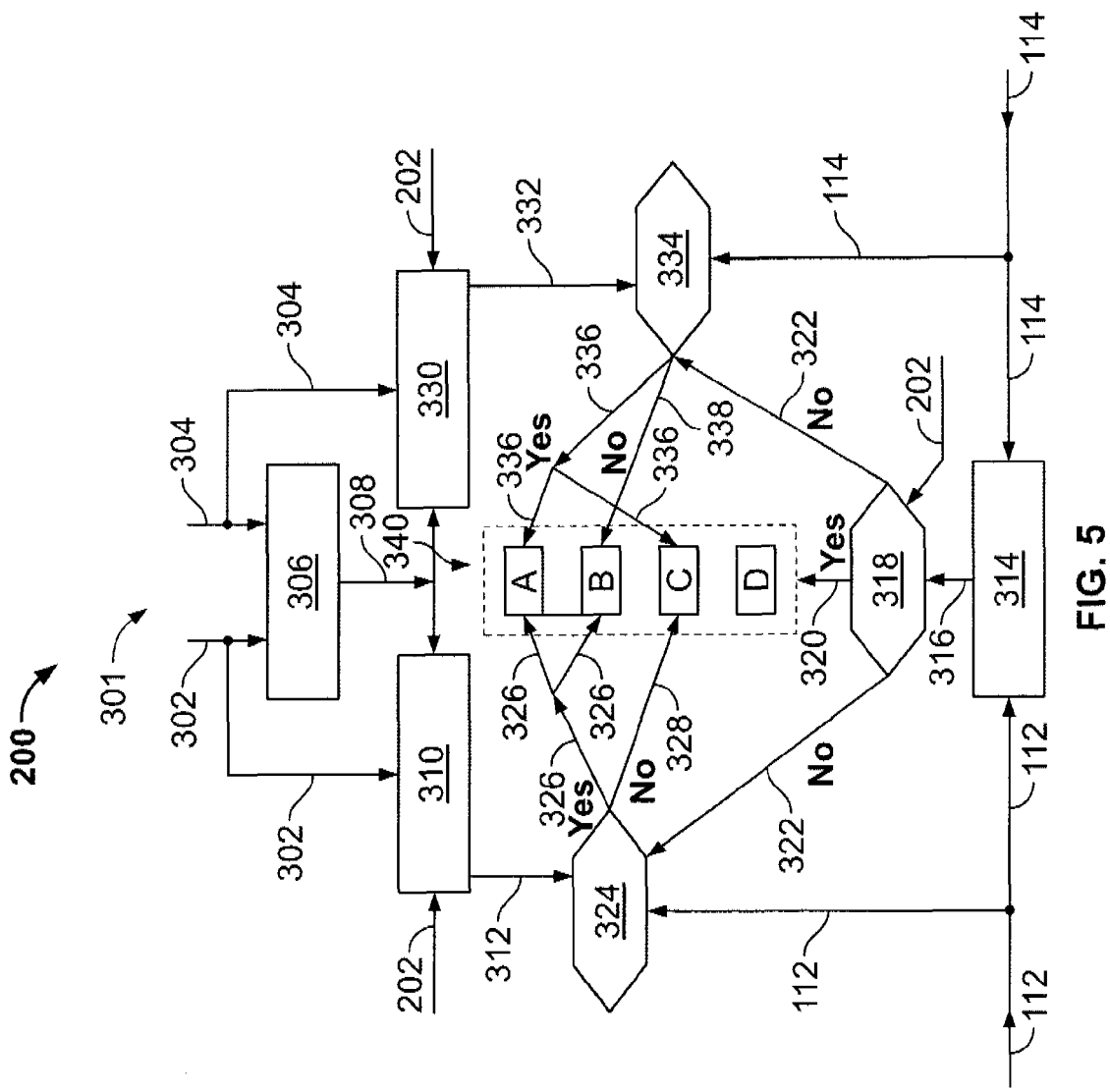
FIG. 6
FIG. 5

12

METHODS AND APPARATUS FOR CONTROLLING CURRENT IN AN ELECTRICAL MACHINE

BACKGROUND OF THE INVENTION

This invention relates generally to electrical machines, and more specifically to methods and apparatus for controlling current in an electrical generator.

At least some known electrical generator systems, for example at least some known wind turbine generators, deliver both active and reactive power to, and/or absorb both active and reactive power from, a power grid. At least some known power grids' procedures, codes, and/or requirements dictate different current responses to different disturbances to the power grid, for example low voltage conditions. However, meeting such procedures, codes, and/or requirements may cause components of the electrical generator system to overload. To avoid overloading components of the system, at least some known electrical generator systems independently control active and reactive currents to limit a total, for example a phasor summation, of such currents. However, at least some known methods for limiting active and reactive currents still risk overloading components of the electrical generator system and/or may under-utilize an electrical power generation capacity of the system.

BRIEF DESCRIPTION OF THE INVENTION

In one aspect, a method for determining electric currents for an electrical machine is provided. The method includes generating a first real power current demand signal and a first reactive power current demand signal. The method also includes determining at least one of a second real power current demand signal and a second reactive power current demand signal by prioritizing at least one of a second real power current demand signal over a second reactive power current demand signal and the second reactive power current demand signal over the second real power current demand signal. The method further includes comparing at least one of the first real power current demand signal and first reactive power current demand signal to at least one electrical machine current limit signal.

In another aspect, a control system for determining electric currents for an electrical machine is provided. The control system includes at least one real power current demand signal functional logic block configured to modulate a real power current demand signal within a first band and modulate a reactive power current demand signal within a second band, wherein the first band is greater than the second band. The control system also includes at least one reactive power current functional logic block configured to modulate a reactive power current demand signal within a third band and modulate a real power current demand signal within a fourth band, wherein the third band is greater than the fourth band. The control system further includes at least one selection mechanism configured to select at least one of the real power current demand signal functional logic block and the reactive power current demand signal functional logic block.

In a further aspect, a wind turbine generator is provided. The wind turbine generator includes a rotor including a hub and at least one rotor blade coupled to the hub. The wind turbine generator also includes a rotor shaft coupled to the hub for rotation therewith. The wind turbine generator further includes at least one electrical generator coupled to the rotor shaft and at least one frequency converter electrically coupled to the electrical generator. The wind turbine generator also includes a control system for determining electric currents in at least one of the at least one electrical generator and the at least one frequency converter. The control system includes at least one real power current demand signal functional logic block, at least one reactive power current functional logic block, and at least one selection mechanism. The at least one real power current demand signal functional logic block is configured to modulate a real power current demand signal within a first band and modulate a reactive power current demand signal within a second band, wherein the first band is greater than the second band. The at least one reactive power current functional logic block is configured to modulate a reactive power current demand signal within a third band and modulate a real power current demand signal within a fourth band, wherein the third band is greater than the fourth band. The at least one selection mechanism is configured to select at least one of the real power current demand signal functional logic block and the reactive power current demand signal functional logic block.

BRIEF DESCRIPTION OF THE DRAWINGS

FIG. 5 is a block diagram of a portion of an alternative logic for priority selection that may be used with the logic shown in FIG. 4;

FIG. 6 is a schematic diagram of an exemplary X-Y graph illustrating the relationship between real and reactive power current components within the logic shown in FIG. 5.

DETAILED DESCRIPTION OF THE INVENTION

As used herein, the term "blade" is intended to be representative of any device that provides reactive force when in motion relative to a surrounding air. As used herein, the term "wind turbine" is intended to be representative of any device that generates rotational energy from wind energy, and more specifically, converts kinetic energy of wind into mechanical energy. As used herein, the term "wind turbine generator" is intended to be representative of any wind turbine that generates electrical power from rotational energy generated from wind energy, and more specifically, converts mechanical energy converted from kinetic energy of wind to electrical power.

Figure 1:
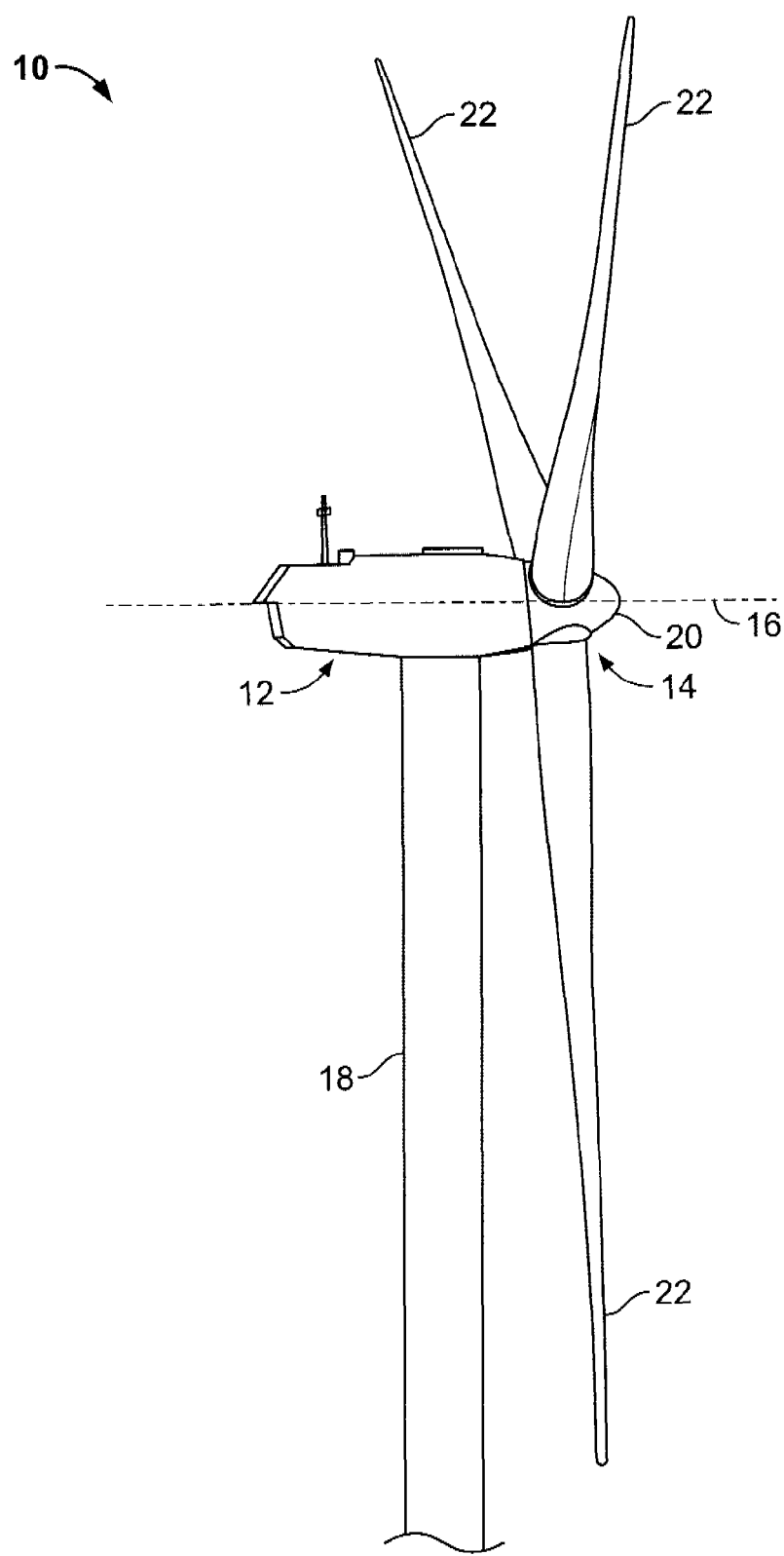
FIG. 1 is a schematic view of an exemplary wind turbine generator.

FIG. 1 is a schematic view of an exemplary wind turbine generator 10. In the exemplary embodiment. wind turbine generator 10 includes a horizontal-axis configuration. Alternatively, wind turbine generator 10 may include, configurations that include, but are not limited to, a vertical-axis configuration (not shown). In the exemplary embodiment, wind turbine generator 10 is electrically coupled to an electrical load (not shown in FIG. 1), such as, but not limited to, an electric power grid. The electric power grid facilitates channeling electric power therefrom to facilitate operation of wind turbine generator 10 and/or its associated components. Such associated components include electric loads that include, but are not limited to, electric-motor driven devices (for example, pitch drives), electronics (for example, control system power supplies), overhead loads (for example, lighting and heating), electric energy storage devices (for example, battery, flywheel, and capacitive storage systems) and other generators. Moreover, the electric power grid facilitates transmitting electric power generated by wind turbine generator 10. Although only one wind turbine generator 10 is illustrated, in some embodiments a plurality of wind turbines 10 may be grouped together, sometimes referred to as a "wind farm".

Wind turbine generator 10 includes a body, sometimes referred to as a "nacelle", and a rotor (generally designated by 14) coupled to nacelle 12 for rotation with respect to nacelle 12 about an axis of rotation 16. In the exemplary embodiment, nacelle 12 is mounted on a tower 18. However, in some embodiments, in addition or alternative to tower-mounted nacelle 12, wind turbine generator 10 includes a nacelle 12 adjacent the ground and/or a surface of water. The height of tower 18 may be any suitable height enabling wind turbine generator 10 to function as described herein. Rotor 14 includes a hub 20 and a plurality of blades 22 (sometimes referred to as "airfoils") extending radially outwardly from hub 20 for converting wind energy into rotational energy. Although rotor 14 is described and illustrated herein as having three blades 22, rotor 14 may have any number of blades 22. Blades 22 may each have any length and be of shape, type, and/or configuration that facilitates operation of wind turbine 10 as described herein.

Figure 2:
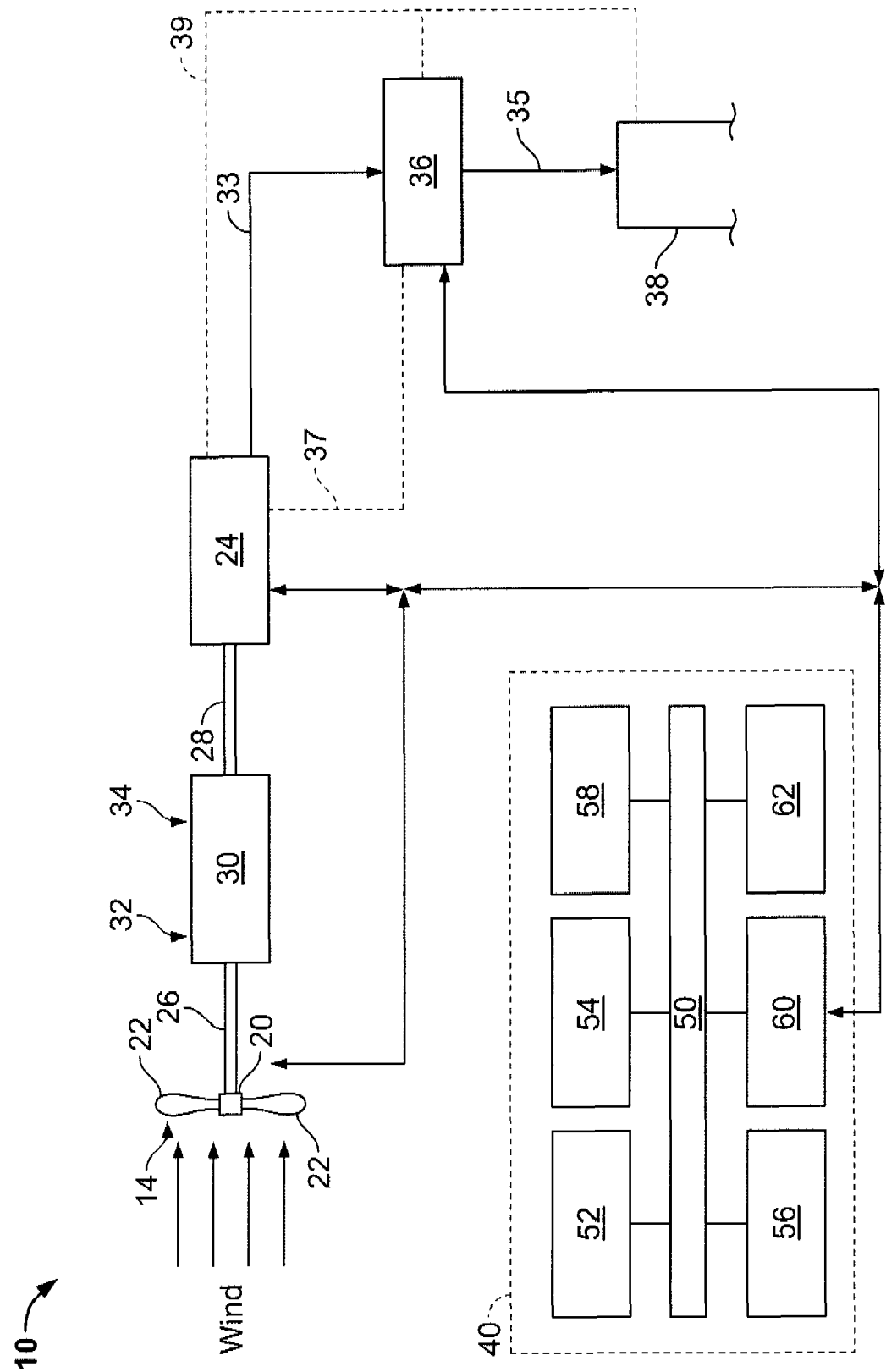
FIG. 2 is a schematic diagram of the wind turbine generator shown in FIG. 1.

FIG. 2 is a schematic diagram of wind turbine generator 10. Wind turbine generator 10 includes an electrical generator 24 coupled to rotor 14 for generating electrical power from the rotational energy generated by rotor 14. Generator 24 may be any suitable type of electrical generator, such as, but not limited to, a wound rotor induction generator, salient pole generator, double-sided generator, excited synchronous generator, permanent magnet generator, and/or doubly-fed induction generator (DFIG). Generator 24 includes a stator (not shown) and a rotor (not shown).

Rotor 14 includes a rotor shaft 26 coupled to rotor hub 20 for rotation therewith. Generator 24 is coupled to rotor shaft 26 such that rotation of rotor shaft 26 drives rotation of the generator rotor, and therefore operation of generator 24. In the exemplary embodiment, the generator rotor has a rotor shaft 28 coupled thereto and coupled to rotor shaft 26 such that rotation of rotor shaft 26 drives rotation of the generator rotor. In other embodiments, the generator rotor is directly coupled to rotor shaft 26, sometimes referred to as a "directdrive wind turbine". In the exemplary embodiment, generator rotor shaft 28 is coupled to rotor shaft 26 through a gearbox 30, although in other embodiments generator rotor shaft 28 is coupled directly to rotor shaft 26. More specifically, in the exemplary embodiment gearbox 30 has a low-speed side 32 coupled to rotor shaft 26 and a high-speed side 34 coupled to generator rotor shaft 28. The torque of rotor 14 drives the generator rotor to thereby generate variable frequency alternating current (AC) electrical power from rotation of rotor 14.

In the exemplary embodiment, a frequency converter 36 is electrically coupled to generator 24 via at least one electrically conductive conduit 33. Converter 36 is configured to convert variable frequency AC electrical power received from generator 24 into fixed frequency AC electrical power for delivery to an electrical load 38, such as, but not limited to an electric power grid, electrically coupled to converter 36 via at least one electrically conductive conduit 35. Frequency converter 36 may be located anywhere within or remote to wind turbine generator 10. For example, in the exemplary embodiment, frequency converter 36 is located within a base (not shown) of tower 18 (shown in FIG. 1).

Alternatively, frequency converter 36 is electrically coupled to generator 24 via at least one electrically conductive conduit 37 in a DFIG configuration as illustrated with dashed lines in FIG. 2. Conduit 37 is electrically coupled to generator 24 and converter 36 in lieu of conduit 33. Similarly, at least one electrically conductive conduit 39 facilitates electrically coupling generator 24 to converter 36 and load 38 in lieu of conduit 35.

In some embodiments, wind turbine generator 10 may include one or more control systems 40 coupled to one or more components of wind turbine generator 10 for generally controlling operation of wind turbine generator 10 and/or as some or all of the components thereof (whether such components are described and/or illustrated herein). In the exemplary embodiment, control system(s) 40 is mounted within nacelle 12. However, additionally or alternatively, one or more control systems 40 may be remote from nacelle 12 and/or other components of wind turbine generator 10. Control system(s) 40 may be used for, but is not limited to, overall system monitoring and control including, for example, but not limited to, pitch and speed regulation, high-speed shaft and yaw brake application, yaw and pump motor application, and/or fault monitoring. Alternative distributed or centralized control architectures may be used in some embodiments.

In the exemplary embodiment, control system(s) 40 include a bus 50 or other communications device to communicate information. One or more processor(s) 52 are coupled to bus 50 to process information. In the exemplary embodiment, processor(s) 52 are controllers. Alternatively, processor(s) 52 are any devices that facilitate operation of system 40 as described herein.

Control system(s) 48 may also include one or more random access memories (RAM) 54 and/or other storage device(s) 56. RAM(s) 54 and storage device(s) 56 are coupled to bus 50 to store and transfer information and instructions to be executed by processor(s) 52. RAM(s) 54 (and/or also storage device(s) 56, if included) can also be used to store temporary variables or other intermediate information during execution of instructions by processor(s) 52. Control system(s) 40 may also include one or more read only memories (ROM) 58 and/or other static storage devices coupled to bus 50 to store and provide static (i.e., non-changing) information and instructions to processor(s) 52. Input/output device(s) 60 may include any device known in the art to provide input data to control system(s) 40, such as, but not limited to, input and/or output data relating to frequency converter 36 and/or electrical load 38, and/or to provide outputs, such as, but not limited to, yaw control outputs and/or pitch control outputs. Instructions may be provided to memory from a storage device, such as, but not limited to, a magnetic disk, a read-only memory (ROM) integrated circuit, CD-ROM, and/or DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein.

Control system(s) 40 may also include a sensor interface 62 that allows control system(s) 40 to communicate with any sensors. Sensor interface 62 can be or can include, for example, one or more analog-to-digital converters that convert analog signals into digital signals that can be used by processor(s) 52.

In the exemplary embodiment, control system(s) 40 are coupled in electronic data communication with at least frequency converter 36, rotor 14, and generator 24 for monitoring and/or controlling operation thereof. Alternatively, control system(s) 40 is coupled in electronic data communication with electrical load 38 for receiving information relating to load 38, such as, but not limited to operational parameters and/or conditions of load 38, and/or for controlling operation of load 38.

In addition or alternatively to control system(s) 40, other control system(s) (not shown) may be used to control operation of frequency converter 36, rotor 14, generator 24 and/or load 38. Such other control system(s) include, but are not limited to, one or more control systems associated with other wind turbine generators (not shown), one or more centralized control systems for a wind farm, and/or one or more control systems associated with load 38.

Figure 3:
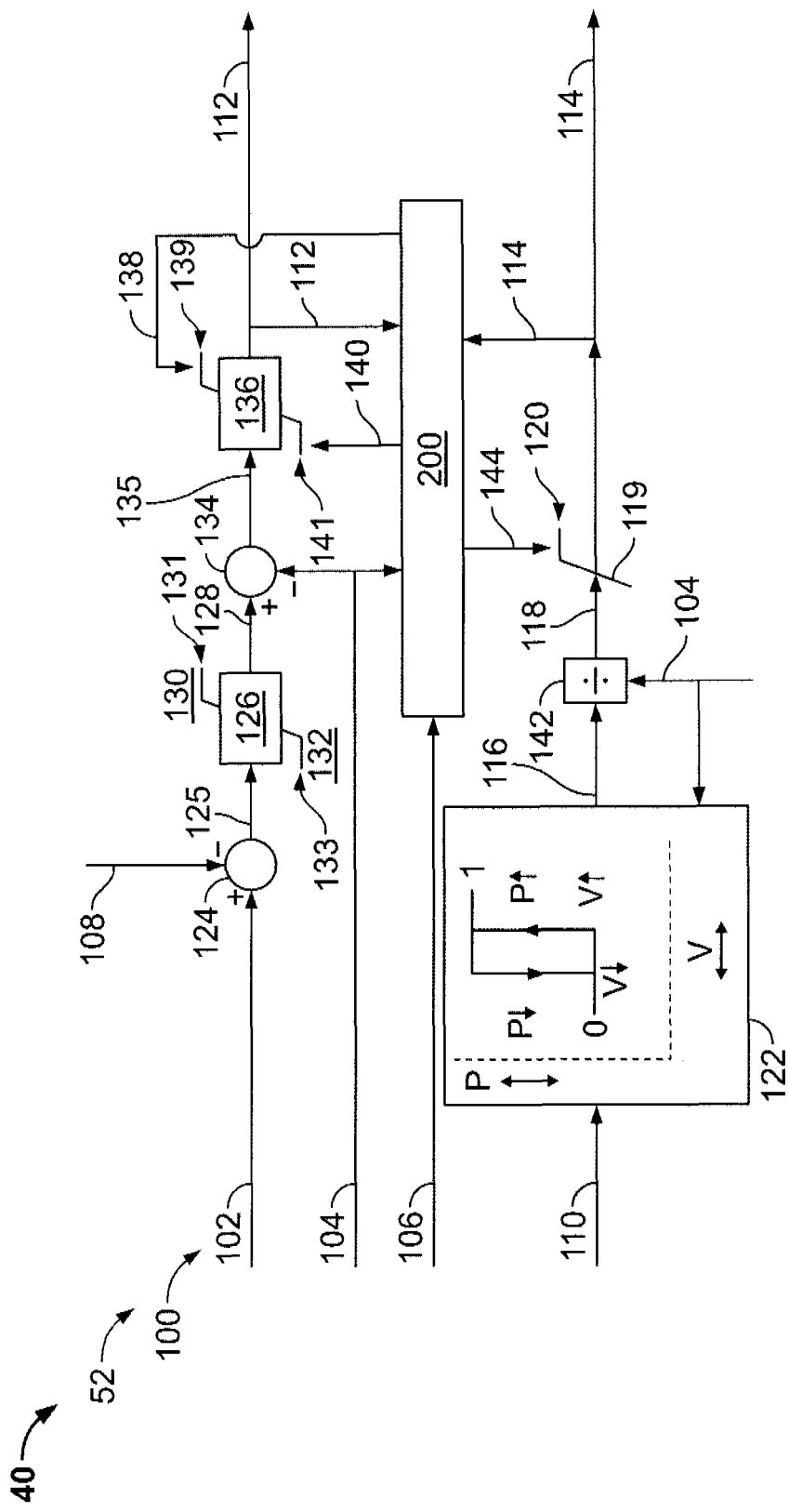
FIG. 3 is a block diagram of exemplary logic for controlling at least a portion of the wind turbine generator shown in FIGS. 1 and 2.

FIG. 3 is a block diagram of exemplary logic 100 for controlling at least a portion of wind turbine generator 10 (shown in FIGS. 1 and 2). In the exemplary embodiment, logic 100 is configured and executed within control system(s) 40. Specifically, logic 100 is executed substantially by processor(s) 52 wherein the remaining components of control system(s) 40 facilitate such logic execution. Alternatively, logic 100 is configured and executed within and/or using other control system(s), such as, but not limited to, one or more control systems associated with other wind turbine generators, one or more centralized control systems for a wind farm, and/or one or more control systems associated with load 38 (neither shown).

Logic 100 is configured to receive an reactive power command input signal 102 indicative of a demand for reactive power that should be transmitted to load 38 via generator 24 and converter 36 (all shown in FIG. 2). Such reactive power demand is influenced by factors that include, but are not limited to, wind turbine 10 equipment and operational limits and existing load-side voltages. Signal 102 is transmitted from at least one wind turbine controller, which in the exemplary embodiment includes processor(s) 40 (shown in FIG. 2).

Logic 100 is also configured to receive a load-side voltage measurement input signal 104 indicative of at least one existing voltage of load 38. Signal 102 is transmitted from the wind turbine controller. Logic 100 is further configured to receive a discrete priority selection input signal 106 that is transmitted from the wind turbine controller, wherein signal 106 is indicative of a selection of priority between real and reactive power (described in more detail below). Logic 100 is also configured to receive a reactive power measurement input signal 108 indicative of reactive power being supplied to load 38. Logic 100 is further configured to receive a real power demand input signal 110 indicative of a demand for real power. Such real power demand is influenced by factors that include, but are not limited to, wind turbine 10 equipment and operational limits, and existing real power generation as a function of wind energy capture and conversion. Real power and reactive power are components of apparent power generated and transmitted by wind turbine generator 10 as described herein and as known in the art.

Logic 100 is configured to receive at least input signals 102, 104, 106, 108 and 110 and generates at least two output signals. Specifically, logic 100 generates a reactive power current command output signal 112 that is transmitted to the wind turbine controller. Signal 112 is used to facilitate control of converter 36 to generate the demanded reactive power. Logic 100 is also configured to generate a real power current command output signal 114 that is transmitted to the wind turbine controller. Signal 114 is used to facilitate control of converter 36 to generate the demanded real power. In the exemplary embodiment, converter 36 facilitates control of generator 24. Alternatively, signals 112 and 114 facilitate control of generator 24 and converter 36 such that either parallel control or independent control of generator 24 and converter 36 is facilitated. Generally, logic 100 uses input signals 102, 104, 106, 108, and 110 to generate reactive power current command output signal 112 and real power current command output signal 114. Real power current and reactive power current are components of total current generated and transmitted by wind turbine generator 10 as described herein and as known in the art.

Logic 100 includes low voltage power logic module 122. Significant dips in grid voltage, sometimes referred to as low voltage transients, may occur. Such dips may induce a tendency for wind turbine generator 10 to overspeed or generate high currents if the grid voltage decreases below a predetermined voltage. Therefore, to facilitate low-voltage ride through features of wind turbine generator 10, module 122 facilitates reducing power generation of wind turbine generator 10 for at least a portion of the voltage dip period and facilitates restoration of power generation when a predetermined grid voltage is restored. In the exemplary embodiment, the configuration and operation of low voltage power logic module 122 is primarily discrete in nature. Specifically, module 122 is configured to receive signals 104 and 110 and generate and transmit a real power demand module output signal 116 as a discrete function of grid voltage measurement signal 104. Signal 116 is generate via at least one algorithm, such algorithm includes signal 110 being multiplied by a variable generated as discussed below.

Logic configured within module 122 is at least partially illustrated in FIG. 3. Module 122 logic is configured with a power (P) versus voltage (V) relationship that is at least partially illustrated with P on the ordinate (Y-axis) and V on the abscissa (X-axis). The bi-directional arrows (($\updownarrow$ associated with P and $\leftrightarrow$ associated with V) indicate that P will increase and/or decrease as a function of V, which may also increase and decrease. In the exemplary embodiment, module 122 is configured to compare signal 104 with at least two predetermined voltages. Specifically, a first predetermined voltage setpoint is configured and designated $V_\downarrow$ such that it represents a predetermined low voltage value. Such setpoint may be configured by an operator or automatically configured by control system(s) 40. Module 122 is configured to insert a value of 0 into the variable position of the multiplication algorithm discussed above, that also includes signal 110, when grid voltage measurement signal 104 decreases below $V_\downarrow$. As a result, module 122 transmits signal 116 with a value of 0 such that real power generation of wind turbine generator 10 begins to decrease towards 0 as indicated by $P_\downarrow$. A second predetermined voltage setpoint is designated $V_\uparrow$ that represents a predetermined voltage restoration value. Such setpoint may also be configured by an operator or automatically configured by control system(s) 40. Module 122 is also configured to insert a value of 1 into the variable position of the multiplication algorithm discussed above that also includes signal 110. Restoration of grid voltage as indicated by signal 104 increasing beyond $V_\uparrow$ induces module 122 to transmit signal 116 with a value substantially similar to signal 110 such that real power generation of wind turbine generator 10 begins to increase away from 0 as indicated by $P_\uparrow$. Alternatively, logic module 122 may be configured in any manner that facilitates operation of logic 100 as described herein, including, but not limited to, using either a substantially analog method of modulating signal 116 or a combination of discrete and analog mechanisms to modulate signal 116.

Reactive power current command output signal 112 is generated within and transmitted from logic 100. Reactive power command input signal 102 is summed with reactive power generated input signal 108 via summing junction 124. Summing junction 124 is configured to generate a difference between the demand for reactive power as measured by signal 102 and reactive power actually being transmitted to load 38 as measured by signal 108. The difference between signals 102 and 108 is generated by junction 124 and transmitted as a reactive power difference signal 125 to a voltage reference function block 126. Function block 126 uses at least one algorithm to calculate a voltage reference signal 128 that is indicative of an appropriate voltage wherein converter 36 facilitates generating the demanded reactive power. The relationship between voltage and reactive power is known in the art. Function block 126 includes at least two registers. Specifically, function block 126 has a first register 131 and a second register 133. First register 131 is configured to receive and hold a high-end voltage limit value 130. Moreover, second register 133 is configured to receive and hold a low-end voltage limit signal 132. Values 130 and 132 facilitate bounding voltage reference signal 128 to within a predetermined range. Values 130 and 132 represent any voltages that facilitate operation of logic 100 as described herein. In the exemplary embodiment, values 130 and 132 are configured by an operator based on design parameters and/or considerations of components of wind turbine generator 10, such as, but not limited to, electrical generator 24. Alternatively, values 130 and 132 are generated by control system(s) 40.

Voltage reference signal 128 is transmitted to a summing junction 134. Summing junction 134 is configured to compare grid voltage input signal 104 with voltage reference signal 128 to generate a voltage difference signal 135. Signal 135 represents a difference between the appropriate voltage for converter 36 to generate such that the demanded reactive power is generated and the voltage actually being generated by converter 36. Voltage difference signal 135 is transmitted to a reactive power current component function block 136. Function block 136 uses at least one algorithm to calculate reactive power current command output signal 112, wherein the relationship between voltage and reactive power is known in the art. Function block 136 includes at least two registers. Specifically, function block 136 has a first register 139 and a second register 141. First register 139 is configured to receive and hold a value received via a high-end current limit signal 138. Moreover, second register 141 is configured to receive and hold a value received via a low-end current limit signal 140. The values within registers 139 and 141 facilitate bounding signal 112 to within a predetermined range. The values within registers 139 and 141 represent any voltages that facilitate operation of logic 100 as described herein. In the exemplary embodiment, signals 138 and 140 are determined using a converter current limit logic 200, as will be described in more detail below. Signal 112 is transmitted from function block 136 to the wind turbine controller and converter current limit logic 200.

Real power current command output signal 114 is also generated within and transmitted from logic 100. Real power demand input signal 110 is transmitted to and modified by low voltage power logic module 122 to generate a real power demand module output signal 116 as described above. Signal 116 is transmitted to a division function block 142 as is load-side voltage measurement input signal 104. Function block 142 divides signal 116 by signal 104 to generate an analog, unbounded real power current command output signal 118. Signal 118 is transmitted to a bounding function block 119. Function block 119 includes at least one register 120 that is configured to receive and hold a value provided via a high-end real power current limit signal 144. Signal 144 is determined by and transmitted from converter current limit logic 200, as will be described in more detail below. Signal 114 is bounded by the value transmitted via signal 144 and is transmitted from function block 119 to the wind turbine controller and converter current limit logic 200.

Figure 4:
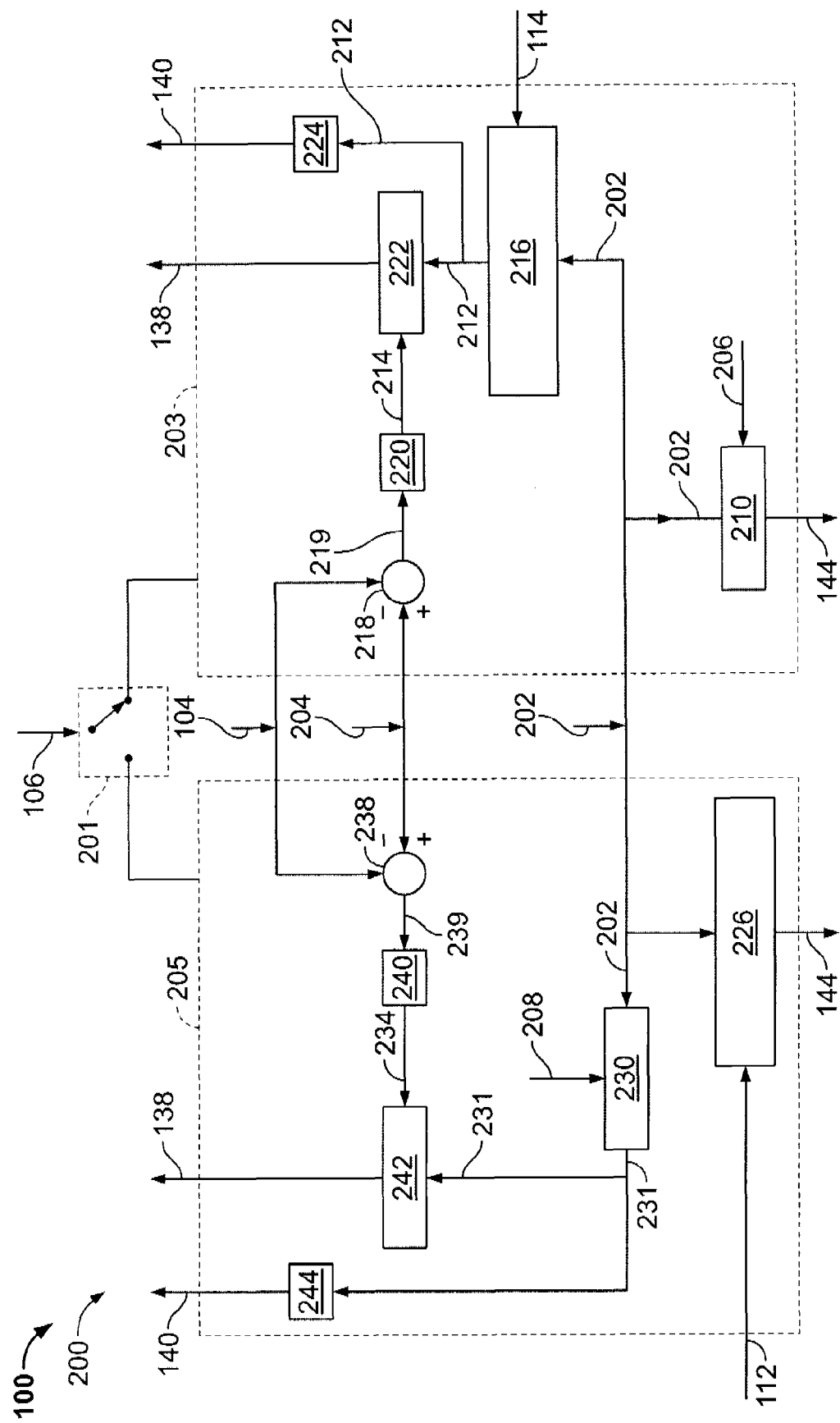
FIG. 4 is a block diagram of an exemplary embodiment of logic for controlling a portion of a frequency converter of the wind turbine generator shown in FIGS. 1 and 2.

FIG. 4 is a block diagram of an exemplary embodiment of logic 200 that is embedded in logic 100 for controlling at least a portion of wind turbine generator 10 (shown in FIGS. 1 and 2). In the exemplary embodiment, logic 200 is configured within processor(s) 52 and executed using control system(s) 40 (both shown in FIG. 2). Specifically, logic 200 is executed substantially by processor(s) 52 wherein the remaining components of control system(s) 40 facilitate such logic execution. Alternatively, logic 100 is configured and executed within and/or using other control system(s), such as, but not limited to, one or more control systems associated with other wind turbine generators, one or more centralized control systems for a wind farm, and/or one or more control systems associated with load 38 (neither shown).

Logic 200 is configured to receive load-side voltage measurement input signal 104 that is indicative of at least one existing voltage of load 38 (shown in FIG. 2). Logic 200 is also configured to receive discrete priority selection input signal 106 that is transmitted from the wind turbine controller, wherein signal 106 is indicative of a selection of priority between real and reactive power. Specifically, signal 106 is a discrete operator- or control system-generated signal that is transmitted to a priority selection function block 201. Function block 201 selects which of two subsequent function blocks receives priority within logic 200. More specifically, function block 201 facilitates selection of either a P Priority functional logic block 203 or Q Priority functional logic block 205 as the priority function block as a function of discrete signal 106. P Priority functional logic block 203 is substantially associated with the real power current component of wind turbine generator 10 power generation. Q Priority functional logic block 205 is substantially associated with the reactive power current component of wind turbine 10 power generation. When logic block 203 is selected as the priority, the real power current component of the electric power generated by wind turbine generator 10 receives control priority over that of the reactive power component. When logic block 205 is selected as the priority, the reactive power current component of the electric power generated by wind turbine generator 10 receives control priority over that of the real power component. Input signal 106 is generated based on design parameters and/or considerations of components of wind turbine generator 10 and/or load 38. For example, in some embodiments, priority input signal 106 is selected based on a host system grid code.

Logic 200 is further configured to receive reactive power current command output signal 112 and real power current command output signal 114, both of which are generated as described above. Logic 200 is also configured to receive a temperature-dependent current limit 202 associated with frequency converter 36 (shown in FIG. 2) that is representative of an elevated current value that converter 36 may transmit prior to approaching a temperature-related component limit. Logic 200 is further configured to receive a voltage limit signal 204 associated with converter 36 that is representative of an elevated voltage that may be induced within converter 36 to mitigate voltage-related degradation of converter 36. Logic 200 is also configured to receive a hard real power current limit signal 206, and a hard reactive power current limit signal 208. Generally, hard limits refer to parameter values that should bound or restrict operation of the associated component or machine. Limit signals 206 and 208 are typically based on parameters and restrictions that include, but are not limited to, current-carrying capabilities of associated wind turbine generator 10 components and load 38. In the exemplary embodiment, limit signals 202, 204, 206 and 208 are operator-entered values that are statically stored within registers (not shown) in control system(s) 40. Alternatively, limit signals 202, 204, 206 and 208 are system-generated values that are calculated via at least one associated algorithm and are dynamically stored within registers (not shown) in control system(s) 40. In general, logic 200 uses at least one of input signals 104, 106, 112, 114, 202, 204, 206, and/or 208 to generate real power current limit signal 144, reactive power current limit signal 138, and reactive power current limit signal 140.

P Priority functional logic block 203 is configured to determine at least one value for high-end real power current limit signal 144. Logic block 203 is also configured to receive temperature-dependent current limit signal 202 that is associated with frequency converter 36. Logic block 203 is further configured to receive hard real power current limit signal 206. Logic block 203 includes a minimum function block 210 that is configured to compare input signals 202 and 206 and transmit the lesser of the two values as limit signal 144 to bounding function block 119 (shown in FIG. 3).

Logic block 203 is also configured to determine at least one value for high-end reactive power current limit signal 138. To facilitate determining maximum reactive power current limit signal 138, a remaining current capability signal 212 of frequency converter 36 is calculated via at least one algorithm that is resident within a current capability function block 216. Signal 212 is generally the remaining current-carrying capability of converter 36, given an existing real power current transmission demand (as measured by signal 114), that may be used for reactive power current transmission. In the exemplary embodiment, the algorithm used is:

$$\text{Signal } 212 = \sqrt{((\text{input signal } 202)^2 - (\text{output signal } 114)^2)} \quad (1)$$

Alternatively, function block 216 includes any number of algorithms in any configuration that facilitate operation of logic 200 as described herein. Function block 216 is configured to receive signals 202 and 114, perform the associated computations to determine signal 212 and transmit signal 212 for further use within logic block 203.

Logic block 203 includes a summing junction 218 that is configured to receive signals 104 and 204. Summing junction 218 is also configured to generate a difference between converter voltage limit signal 204 and load-side voltage measurement input signal 104. The difference between signals 204 and 104 is generated by junction 218 and transmitted as a voltage difference signal 219 to a subtransient reactance function block 220. Subtransient reactance typically refers to a relative measurement (in percent) of the internal impedance of an AC generator during harmonic phenomena including, but limited to, the first electrical cycle after an electrical fault. Such subtransient reactance facilitates determining an associated electric current during substantially the same period. Therefore, in the exemplary embodiment, function block 220 is configured with at least one resident algorithm to generate a voltage-based reactive power current limit signal 214. Signal 214 is at least partially based on voltage difference signal 219 and electrical properties of generator 24, converter 36, load 38 and conduits 33, 35, 37 and/or 39 (all shown in FIG. 2). Also, in the exemplary embodiment, the algorithms within function block 220 use substantially static models of subtransient reactance. Alternatively, function block 220 is configured with at least one algorithm that computes signal 214 in any manner that facilitates operation of logic 200 as described herein including, but not limited to, transient reactance and steady-state reactance. Also, alternatively, the algorithms within function block 220 use substantially dynamic models of subtransient reactance, wherein signal 214 is substantially adaptive to conditions associated with wind turbine generator 10 and load 38.

Logic block 203 also includes a minimum function block 222 that is configured to receive and compare signals 212 and 214 and transmit the lesser of the two values as limit signal 138 to the appropriate register (not shown) associated with total current reactive power component function block 136 (shown in FIG. 3). High-end reactive power current limit signal 138 facilitates limiting reactive power current command output signal 112, that is transmitted to the wind turbine controller, to a value the represents substantially the full range of remaining current-carrying capacity of converter 36. Therefore, logic block 203 facilitates controlling the reactive power current component such that a potential to approach an upper range of current-carrying limits of generator 24, converter 36, load 38 and conduits 33, 35, 37 and/or 39 is mitigated.

Logic block 203 is configured to generate low-end reactive power current limit signal 140. Therefore, logic block 203 further includes a multiplication function block 224 that is configured to receive signal 212, multiply signal 212 by a constant value, and transmit signal 140. In the exemplary embodiment, function block 224 includes a constant of −1 and generates and transmits signal 140 to the appropriate register (not shown) associated with total current reactive power component function block 136. Such computation as performed within function block 224 facilitates controlling the reactive power current component such that a potential to approach a lower range of current-carrying limits of generator 24, converter 36, load 38 and conduits 33, 35, 37 and/or 39 is mitigated. Computing, transmitting and using signals 138 and 140 as described herein facilitates controlling the reactive power current component for leading and lagging power factors as is know in the art.

Q Priority functional logic block 205 is configured to determine at least one value for high-end real power current limit signal 144. Logic block 205 is also configured to receive temperature-dependent current limit signal 202 that is associated with frequency converter 36. Logic block 205 is further configured to receive reactive power current command output signal 112. Signal 144 is calculated via at least one algorithm that is resident within a current capability function block 226. Signal 144 is generally the remaining current-carrying capability of converter 36, given an existing reactive power current transmission demand (as measured by signal 112), that may be used for determining remaining real power current transmission capabilities. In the exemplary embodiment, the algorithm used is:

$$\text{Signal } 144 = \sqrt{((\text{input signal } 202)^2 - (\text{output signal } 112)^2)} \quad (2)$$

Alternatively, function block 226 includes any number of algorithms in any configuration that facilitate operation of logic 200 as described herein. Signal 144 is transmitted to bounding function block 119 (shown in FIG. 3).

Logic block 205 is also configured to determine at least one value for high-end reactive power current limit signal 138.

Logic block 205 is further configured to receive temperature-dependent current limit signal 202 that is associated with frequency converter 36. Logic block 205 is also configured to receive hard reactive power current limit signal 208. Logic block 205 includes a minimum function block 230 that is configured to compare input signals 202 and 208 and transmit the lesser of the two values as a current limit signal 231.

Logic block 205 includes a summing junction 238 that is configured to receive signals 104 and 204. Summing junction 238 is also configured to generate a difference between converter voltage limit signal 204 and load-side voltage measurement input signal 104. The difference between signals 204 and 104 is generated by junction 238 and transmitted as a voltage difference signal 239 to a subtransient reactance function block 240. In the exemplary embodiment, function block 240 is configured with at least one resident algorithm to generate a voltage-based reactive power current limit signal 234. Signal 234 is at least partially based on voltage difference signal 239 and electrical properties of generator 24, converter 36, load 38 and conduits 33, 35, 37 and/or 39. Also, in the exemplary embodiment, the algorithms within function block 240 use substantially static models of subtransient reactance. Alternatively, function block 240 is configured with at least one algorithm that computes signal 234 in any manner that facilitates operation of logic 200 as described herein including, but not limited to, transient reactance and steady-state reactance. Also, alternatively, the algorithms within function block 240 use substantially dynamic models of subtransient reactance, wherein signal 234 is substantially adaptive to conditions associated with wind turbine generator 10 and load 38.

Logic block 205 also includes a minimum function block 242 that is configured to receive and compare signals 231 and 234 and transmit the lesser of the two values as limit signal 138 to the appropriate register (not shown) associated with total current reactive power component function block 136. High-end reactive power current limit signal 138 facilitates limiting reactive power current command output signal 112, that is transmitted to the wind turbine controller, to a value the represents substantially the full range of remaining current-carrying capacity of converter 36. Therefore, logic block 205 facilitates controlling the reactive power current component such that a potential to approach an upper range of current-carrying limits of generator 24, converter 36, load 38 and conduits 33, 35, 37 and/or 39 is mitigated.

Logic block 205 is configured to generate low-end reactive power current limit signal 140. Therefore, logic block 205 further includes a multiplication function block 244 that is configured to receive signal 231, multiply signal 231 by a constant value, and transmit signal 140. In the exemplary embodiment, block 244 includes a constant of −1 and generates and transmits signal 140 to the appropriate register (not shown) associated with total current reactive power component function block 136. Such computation as performed within function block 244 facilitates controlling the reactive power current component such that a potential to approach a lower range of current-carrying limits of generator 24, converter 36, load 38 and conduits 33, 35, 37 and/or 39 is mitigated. Computing, transmitting and using signals 138 and 140 as described herein facilitates controlling the reactive power current component for leading and lagging power factors as is know in the art.

In the exemplary embodiment, summing junction 238, signal 239, function block 240, signal 234, function block 242 and function block 244 associated with logic block 205 are identical to summing junction 218, function block 220, signal 214, function block 222 and function block 224 associated with logic block 203. Alternatively, summing junction 238, signal 239, function block 240, signal 234, function block 242 and function block 244 associated with logic block 205 are configured and generated in any manner that facilitates operation of logic 200 as described herein.

A method for determining electric currents for wind turbine generator 10 is provided. The method includes generating a first iteration of real power current demand signal 114 and a first iteration of reactive power current demand signal 112. The method also includes determining a second iteration of real power current demand signal 114 and second iteration of reactive power current demand signal 112 by prioritizing the second iteration of real power current demand signal 114 over the second iteration of reactive power current demand signal 112. Alternatively, the method includes determining a second iteration of real power current demand signal 114 and second iteration of reactive power current demand signal 112 by prioritizing the second iteration of reactive power current demand signal 112 over the second iteration of real power current demand signal 114. The method further includes comparing at least one of the second iteration of real power current demand signal 114 and the second iteration of reactive power current demand signal 112 to at least one electrical machine current limit signal 202.

Referring to FIGS. 3 and 4, logic 200 receives a first iteration of signals 112 and 114, and depending on which of logic blocks 203 and 205 are selected, transmits bounding value signals 144, and 138 and 140, to function blocks 119 and 136, respectively to facilitate generating a second iteration of signals 112 and 114 as discussed further below.

During operation, logic 100 receives reactive power command input signal 102, wherein signal 102 is indicative of a demand for reactive power that should be transmitted to load 38 via generator 24 and converter 36. Such reactive power demand is influenced by factors that include, but are not limited to, wind turbine 10 equipment and operational limits and existing load-side voltages. Signal 102 is transmitted from at least one wind turbine controller, which in the exemplary embodiment includes processor(s) 52.

Logic 100 also receives reactive power measurement input signal 108, wherein signal 108 is indicative of reactive power being supplied to load 38. Summing junction 124 receives signals 102 and 108 and generates a difference between the demand for reactive power as measured by signal 102 and reactive power actually being transmitted to load 38 as measured by signal 108. The difference between signals 102 and 108 is generated by junction 124 and transmitted as reactive power difference signal 125 to voltage reference function block 126. Function block 126 uses at least one algorithm to calculate voltage reference signal 128, signal 128 being indicative of an appropriate voltage for converter 36 to induce to facilitate generating the demanded reactive power. Voltage reference signal 128 is bounded by high-end voltage limit signal 130 and low-end voltage limit signal 132. Voltage reference signal 128 is transmitted to summing junction 134.

Logic 100 further receives load-side voltage measurement input signal 104 indicative of at least one existing voltage of load 38. Summing junction 134 is configured to compare grid voltage input signal 104 with voltage reference signal 128 to generate a voltage difference signal 135. Signal 135 represents a difference between the appropriate voltage for converter 36 to generate to develop the demanded reactive power and the voltage actually being generated by converter 36. Voltage difference signal 135 is transmitted to a total current reactive power component function block 136. Function block 136 uses at least one algorithm to calculate a first iteration of reactive power current command output signal 112, wherein the relationship between voltage and reactive power is known in the art. Function block 136 is bounded by a high-end reactive power current limit signal 138 and a low-end reactive power current limit signal 140. Limit signals 138 and 140 are determined using converter current limit logic 200. Signal 112 is transmitted from function block 136 to the wind turbine controller and converter current limit logic 200.

Logic 100 also receives real power demand input signal 110 indicative of a demand for real power. Such real power demand is influenced by factors that include, but are not limited to, wind turbine 10 equipment and operational limits, and existing real power generation as a function of wind energy capture and conversion. Module 122 receives signals 104 and 110 and generates and transmits real power demand module output signal 116 as a discrete function of grid voltage measurement signal 104. Signal 116 is generated via at least one algorithm, such algorithm includes signal 110 being multiplied by either a 0 or a 1. When grid voltage measurement signal 104 decreases below a predetermined $V_\downarrow$, indicative of a grid low voltage transient, a value of 0 is inserted into the multiplication algorithm discussed above that also includes signal 110. Module 122 transmits signal 116 with a value of 0 such that real power generation of wind turbine generator 10 begins to decrease towards 0. A restoration of grid voltage as indicated by signal 104 increasing beyond $V_\uparrow$ induces module 122 to transmit signal 116 with a value substantially similar to signal 110 such that real power generation of wind turbine generator 10 begins to increase away from 0.

Signal 116 is transmitted to division function block 142 as is signal 104. Function block 142 divides signal 116 by signal 104 to generate an unbounded real power current command output signal 118. Signal 118 is transmitted to bounding function block 119 wherein signal 118 is bounded by a high-end real power current limit signal 144 that is determined by and transmitted from converter current limit logic 200. A first iteration of signal 114 is transmitted from function block 119 to the wind turbine controller and converter current limit logic 200.

Real power and reactive power priority are selected via discrete priority selection input signal 106 that is transmitted from the wind turbine controller to priority selection function block 201, wherein signal 106 is indicative of a selection of priority between real and reactive power. Function block 201 selects which of two function blocks receives priority within logic 200. More specifically, function block 201 facilitates selection of either a P Priority functional logic block 203 or Q Priority functional logic block 205 as the priority function block as a function of discrete signal 106.

During operation, if real power has been selected to have priority, P Priority functional logic block 203 determines signals 138, 140 and 144 and Q Priority functional logic block 205 is substantially idle. Minimum function block 210 within logic block 203 receives temperature-dependent current limit signal 202 that is associated with frequency converter 36. Function block 210 also receives hard real power current limit signal 206. Function block 210 compares input signals 202 and 206 and transmits the lesser of the two values as limit signal 144 to bounding function block 119.

Function block 216 receives signals 202 and 114, performs the associated computations to determine remaining current capability signal 212 and transmits signal 212 to minimum function block 222 and function block 224. Signal 212 is generally the remaining current-carrying capability of converter 36, given an existing real power current transmission demand (as measured by signal 114), that may be used for reactive power current transmission.

Summing junction 218 receives signals 104 and 204 and generate a difference between converter voltage limit signal 204 and load-side voltage measurement input signal 104. The difference between signals 204 and 104 is generated by junction 218 and transmitted as voltage difference signal 219 to subtransient reactance function block 220. Function block 220 generates a voltage-based reactive power current limit signal 214. Signal 214 is at least partially based on voltage difference signal 219 and electrical properties of generator 24, converter 36, load 38 and conduits 33, 35, 37 and/or 39.

Minimum function block 222 receives and compares signals 212 and 214 and transmits the lesser of the two values as high-end reactive power current limit signal 138 to the appropriate register (not shown) associated with total current reactive power component function block 136. Signal 138 facilitates limiting reactive power current command output signal 112, that is transmitted to the wind turbine controller, to a value the represents substantially the full range of remaining current-carrying capacity of converter 36. Therefore, logic block 203 facilitates controlling the reactive power current component such that a potential to approach an upper range of current-carrying limits of generator 24, converter 36, load 38 and conduits 33, 35, 37 and/or 39 is mitigated.

Multiplication function block 224 receives signal 212, multiplies signal 212 by a constant value, and generates and transmits low-end reactive power current limit signal 140. Block 224 includes a constant of −1 and generates and transmits signal 140 to the appropriate register (not shown) associated with total current reactive power component function block 136. Such computation as performed within function block 224 facilitates controlling the reactive power current component such that a potential to approach a lower range of current-carrying limits of generator 24, converter 36, load 38 and conduits 33, 35, 37 and/or 39 is mitigated. Computing, transmitting and using signals 138 and 140 as described herein facilitates controlling the reactive power current component for leading and lagging power factors as is know in the art.

During operation, if reactive power has been selected to have priority, Q Priority functional logic block 205 determines signals 138, 140 and 144 and P Priority functional logic block 203 is substantially idle. Current capability function block 226 receives temperature-dependent current limit signal 202 and reactive power current command output signal 112. Function block 226 determines and transmits high-end real power current limit signal 144 to bounding function block 119. Signal 144 is generally the remaining current-carrying capability of converter 36, given an existing reactive power current transmission demand (as measured by signal 112), that may be used for determining remaining real power current transmission capabilities.

Minimum function block 230 receives and compares input signal 202 and hard reactive power current limit signal 208. Function block transmits the lesser of the two values as current limit signal 231 to function blocks 242 and 244.

Summing junction 238 receives signals 104 and 204 and generates a difference between converter voltage limit signal 204 and load-side voltage measurement input signal 104. The difference between signals 204 and 104 is generated by junction 238 and transmitted as voltage difference signal 239 to subtransient reactance function block 240. Function block 240 generates a voltage-based reactive power current limit signal 234. Signal 234 is at least partially based on voltage difference signal 239 and electrical properties of generator 24, converter 36, load 38 and conduits 33, 35, 37 and/or 39.

Minimum function block 242 receives and compares signals 232 and 234 and transmits the lesser of the two values as high-end reactive power current limit signal 138 to the appropriate register (not shown) associated with total current reactive power component function block 136. Signal 138 facilitates limiting reactive power current command output signal 112, that is transmitted to the wind turbine controller, to a value the represents substantially the full range of remaining current-carrying capacity of converter 36. Therefore, logic block 205 facilitates controlling the reactive power current component such that a potential to approach an upper range of current-carrying limits of generator 24, converter 36, load 38 and conduits 33, 35, 37 and/or 39 is mitigated.

Multiplication function block 244 receives signal 232, multiplies signal 232 by a constant value, and generates and transmits low-end reactive power current limit signal 140. Block 244 includes a constant of −1 and generates and transmits signal 140 to the appropriate register (not shown) associated with total current reactive power component function block 136. Such computation as performed within function block 244 facilitates controlling the reactive power current component such that a potential to approach a lower range of current-carrying limits of generator 24, converter 36, load 38 and conduits 33, 35, 37 and/or 39 is mitigated. Computing, transmitting and using signals 138 and 140 as described herein facilitates controlling the reactive power current component for leading and lagging power factors as is know in the art.

FIG. 5 is a block diagram of a portion of an alternative logic 301 for priority selection that may be used with logic 200. Logic 301 is a functional alternative to priority selection function block 201 and priority selection input signal 106 (both shown in FIG. 4). In general, logic 301 facilitates generating and transmitting signals 138, 140 and 144 for use within logic 100 as described above. Logic 301 is configured to receive a reactive power ($Q_0$) signal 302. Logic 301 is also configured to receive a desired real power ($P_0$) signal 304. $Q_0$ signal 302 and $P_0$ signal 304 are indicative of the desired reactive power value and real power value, respectively, to be supplied to load 38 to facilitate maintaining a desired power factor value based on a ratio of $Q_0$ signal 302 to $P_0$ signal 304, or, a value of $Q_0/P_0$. In the exemplary embodiment, $Q_0$ signal 302 and $P_0$ signal 304 are substantially static, operator-defined values. Alternatively, $Q_0$ signal 302 to $P_0$ signal 304 are substantially dynamic values generated by control system(s) 40.

Signals 302 and 304 are transmitted to a desired apparent power function block 306 that is configured to receive signals 302 and 304 and calculate and transmit a desired apparent power ($S_0$) signal 308 via at least one algorithm. In this alternative embodiment, the algorithm used is:

$$S_0 \text{ signal } 308 = \sqrt{((Q_0 \text{ signal } 302)^2 + (P_0 \text{ signal } 304)^2)} \tag{3}$$

Alternatively, function block 306 includes any number of algorithms in any configuration that facilitate operation of logic 301 as described herein.

Logic 301 also includes a desired reactive power current ($I_{q0}$) function block 310. Function block 310 is configured to receive $Q_0$ signal 302, $S_0$ signal 308 and temperature-dependent current limit ($I_{maxTD}$) signal 202. Function block 310 is also configured to calculate and transmit a desired reactive power current ($I_{q0}$) signal 312 via at least one algorithm. $I_{q0}$ signal 312 is representative of a fraction of total permitted current, or the temperature-dependent current limit ($I_{maxTD}$) (as represented by signal 202), that is proportioned to the desired reactive power current. In this alternative embodiment, the algorithm used is:

$$I_{q0} \text{ signal } 312 = \sqrt{(I_{maxTD} \text{ signal } 202) \times (Q_0 \text{ signal } 302/S_0 \text{ signal } 308))} \tag{4}$$

Alternatively, function block 310 includes any number of algorithms in any configuration that facilitate operation of logic 301 as described herein.

Logic 301 further includes a total current command ($I_{cmd}$) function block 314. $I_{cmd}$ function block 314 is configured to receive reactive power current command ($I_{qcmd}$) output signal 112 and real power current command ($I_{pcmd}$) output signal 114. $I_{cmd}$ function block 314 is also configured to calculate and transmit a total current command ($I_{cmd}$) signal 316 via at least one algorithm. In this alternative embodiment, the algorithm used is:

$$I_{cmd} \text{ signal } 316 = \sqrt{(I_{qcmd} \text{ output signal } 112)^2 + (I_{pcmd} \text{ output signal } 114)^2)} \tag{5}$$

Alternatively, function block 314 includes any number of algorithms in any configuration that facilitate operation of logic 301 as described herein.

Logic 301 also includes a total current comparison function block 318. Function block 318 is configured to receive $I_{maxTD}$ signal 202 and $I_{cmd}$ signal 316. Function block 318 is also configured to compare signals 202 and 316 to each other. In the event that $I_{cmd}$ signal 316 is less than $I_{maxTD}$ signal 202, a discrete "YES" signal 320 is generated for transmission and use within logic 301 as discussed further below. In the event that $I_{cmd}$ signal 316 is not less than $I_{maxTD}$ signal 202, a discrete "NO" signal 322 is generated for transmission and use within logic 301 as discussed further below.

Logic 301 further includes a reactive power current component ($I_q$) comparison function block 324 that is configured to receive $I_{q0}$ signal 312 from function block 310, reactive power current command ($I_{qcmd}$) output signal 112, and "NO" signal 322 from function block 318. Function block 324 is also configured to convert a value associated with $I_{q0}$ signal 312 to an absolute value of $I_{q0}$ signal 312. Function block 314 is further configured to convert a value associated with $I_{qcmd}$ output signal 112 to an absolute value of $I_{qcmd}$ output signal 112. Absolute values of signals 112 and 312 are calculated to account for reactive power being leading or lagging, as is known in the art. Function block 324 is also configured to compare the absolute value of $I_{q0}$ signal 312 with the absolute value of $I_{qcmd}$ output signal 112. Such comparisons are performed when a discrete "NO" signal 322 is received from function block 318. In the event that the absolute value of $I_{q0}$ signal 312 is less than the absolute value of $I_{qcmd}$ output signal 112, a discrete "YES" signal 326 is generated for transmission and use within logic 301 as discussed further below. In the event that the absolute value of $I_{q0}$ signal 312 is not less than the absolute value of $I_{qcmd}$ output signal 112, a discrete "NO" signal 328 is generated for transmission and use within logic 301 as discussed further below. A plain description of the logic contained within function block 324 is represented by: Is the desired reactive power current component (as represented by $I_{q0}$ signal 312) less than the commanded reactive power current component (as represented by $I_{qcmd}$ signal 112)?

Logic 301 also includes a desired real power current component ($I_{p0}$) function block 330. Function block 330 is configured to receive $P_0$ signal 304, $S_0$ signal 308 and temperature-dependent current limit ($I_{maxTD}$) signal 202. Function block 330 is also configured to calculate and transmit a desired real power current ($I_{p0}$) signal 332 via at least one algorithm. $I_{p0}$ signal 332 is representative of a fraction of total permitted current, the temperature-dependent current limit ($I_{maxTD}$) (as represented by signal 202), that is proportioned to the desired real power current. In this alternative embodiment, the algorithm used is:

$$I_{p0} \text{ signal } 332 = \sqrt{(I_{maxTD} \text{ signal } 202) \times (P_0 \text{ signal } 304/S_0 \text{ signal } 308))} \quad (6)$$

Alternatively, function block 330 includes any number of algorithms in any configuration that facilitate operation of logic 301 as described herein.

Logic 301 further includes a real power current ($I_p$) comparison function block 334 that is configured to receive $I_{p0}$ signal 332 from function block 330, real power current command ($I_{pcmd}$) output signal 114, and "NO" signal 322 from function block 318. Function block 334 is also configured to compare the value of $I_{p0}$ signal 332 with the absolute value of $I_{pcmd}$ output signal 114. Such comparisons are performed when a discrete "NO" signal 322 is received from function block 318. In the event that the value of $I_{p0}$ signal 332 is less than the value of $I_{pcmd}$ output signal 114, a discrete "YES" signal 336 is generated for transmission and use within logic 301 as discussed further below. In the event that the value of $I_{p0}$ signal 332 is not less than the value of $I_{pcmd}$ output signal 114, a discrete "NO" signal 338 is generated for transmission and use within logic 301 as discussed further below. A plain description of the logic contained within function block 334 is represented by: Is the desired real power current component (as represented by $I_{p0}$ signal 332) less than the commanded real power current component (as represented by $I_{pcmd}$ signal 114)?

Alternative logic 301 also includes a plurality of logic conditions 340. Each logic condition 340, labeled A, B, C and D, is configured to represent a combination of comparisons between desired and commanded electric current conditions, and limiting electric current parameters. The results of such comparisons generate appropriate values for high-end voltage limit signal 138, low-end voltage limit signal 140, and high-end real power current limit signal 144 as discussed further below.

Specifically, logic condition A is attained when discrete "NO" signal 322 is transmitted to function blocks 324 and 334 from function block 318, discrete "YES" signal 326 is transmitted from function block 324 within logic 301 and discrete "YES" signal 336 is transmitted from function block 334 within logic 301.

A plain description of logic condition A is provided as follows. A "no" response (associated with "NO" signal 322) is generated to a first question: "Is the commanded total current (as represented by $I_{cmd}$ signal 316) less than the temperature-dependent current limit (as represented by $I_{maxTD}$ signal 202)?" Such a "no" response is indicative of the commanded current being transmitted to load 38 (shown in FIG. 2) exceeding the temperature-dependent current limit of converter 36 (shown in FIG. 2). Therefore, at least a portion of the subsequent logic, specifically that associated with the next two questions, is configured to determine which, if any, of the reactive and/or real power components (associated with the desired components as a function of the temperature-dependent current limit (as represented by $I_{maxTD}$ signal 202)) transmitted to load 38 exceeds their associated commanded values as discussed below.

Subsequently, to continue to attain logic condition A, a "yes" response (associated with signal 326) is generated to the question: "Is the desired reactive power current component (as represented by $I_{q0}$ signal 312) less than the commanded reactive power current component (as represented by $I_{qcmd}$ signal 112)?" Furthermore, a "yes" response (associated with signal 336) is generated to the question: "Is the desired real power current component (as represented by $I_{p0}$ signal 332) less than the commanded real power current component (as represented by $I_{pcmd}$ signal 114)?" Such a "yes" response to these two questions is indicative that both the reactive and real power components (proportioned to $I_{maxTD}$) desired to be transmitted to load 38 (shown in FIG. 2) do not exceed the commanded reactive and real power components. Therefore, while the commanded total current exceeds the current limit, the desired real and reactive power currents proportioned to the limit do not exceed the commanded real and reactive power currents.

Also, specifically, logic condition B is attained when discrete "NO" signal 322 is transmitted to function blocks 324 and 334 from function block 318, discrete "YES" signal 326 is transmitted from function block 324 and discrete "NO" signal 338 is transmitted from function block 334 within logic 301.

A plain description of logic condition B is described as follows. A "no" response (associated with "NO" signal 322) is generated to a first question: "Is the commanded total current (as represented by $I_{cmd}$ signal 316) less than the temperature-dependent current limit (as represented by $I_{maxTD}$ signal 202)?" Such a "no" response is indicative of the commanded current being transmitted to load 38 exceeding the temperature-dependent current limit of converter 36. Therefore, at least a portion of the subsequent logic, specifically that associated with the next two questions, is configured to determine which, if any, of the reactive and/or real power components (associated with the desired components as a function of the temperature-dependent current limit (as represented by $I_{maxTD}$ signal 202)) that may be transmitted to load 38 exceeds their associated commanded values as discussed below.

Subsequently, to continue to attain logic condition B, a "yes" response (associated with signal 326) is generated to the question: "Is the desired reactive power current component (as represented by $I_{q0}$ signal 312) less than the commanded reactive power current component (as represented by $I_{qcmd}$ signal 112)?" Moreover, a "no" response (associated with signal 338) is generated to the question: "Is the desired real power current component (as represented by $I_{p0}$ signal 332) less than the commanded real power current component (as represented by $I_{pcmd}$ signal 114)?" Such a "yes" response to the first question is indicative that the reactive power component (proportioned to $I_{maxTD}$) desired to be transmitted to load 38 does not exceed the commanded reactive power component. Furthermore, such a "no" response to the second question is indicative that the real power component (proportioned to $I_{maxTD}$) desired to be transmitted to load 38 does exceed the commanded real power component. Therefore, while the commanded total current exceeds the current limit, the desired reactive power current proportioned to the limit does not exceed the commanded reactive power current. However, the desired real power current proportioned to the limit does exceed the commanded real power current.

Further, specifically, logic condition C is attained when discrete "NO" signal 322 is transmitted to function blocks 324 and 334 from function block 318, discrete "NO" signal 328 is transmitted from function block 324 and discrete "YES" signal 336 is transmitted from function block 334 within logic 301.

A plain description of logic condition C is described as follows. A "no" response (associated with "NO" signal 322) is generated to a first question: "Is the commanded total current (as represented by $I_{cmd}$ signal 316) less than the temperature-dependent current limit (as represented by $I_{maxTD}$ signal 202)?" Such a "no" response is indicative of the commanded current being transmitted to load 38 exceeding the temperature-dependent current limit of converter 36. Therefore, at least a portion of the subsequent logic, specifically that associated with the next two questions, is configured to determine which, if any, of the reactive and/or real power components (associated with the desired components as a function of the temperature-dependent current limit (as represented by $I_{maxTD}$ signal 202)) transmitted to load 38 exceeds their associated commanded values as discussed below.

Subsequently, to continue to attain logic condition C, a "no" response (associated with signal 328) is generated to the question: "Is the desired reactive power current component (as represented by $I_{q0}$ signal 312) less than the commanded reactive power current component (as represented by $I_{qcmd}$ signal 112)?" Moreover, a "yes" response (associated with signal 336) is generated to the question: "Is the desired real power current component (as represented by $I_{p0}$ signal 332) less than the commanded real power current component (as represented by $I_{pcmd}$ signal 114)?" Such a "no" response to the first question is indicative that the desired reactive power component (proportioned to $I_{maxTD}$) being transmitted to load 38 does exceed the commanded reactive power component. Furthermore, such a "yes" response to the second question is indicative that the desired real power component (proportioned to $I_{maxTD}$) being transmitted to load 38 does not exceed the commanded real power component. Therefore, while the commanded total current exceeds the current limit, the desired real power current proportioned to the limit does not exceed the commanded real power current. However, the desired reactive power current proportioned to the limit does exceed the commanded reactive power current.

Also, specifically, logic condition D is attained when discrete "YES" signal 320 from function block 318 is transmitted within logic 301. A plain description of logic condition D is described as follows. A "yes" response (associated with signal 320) is generated to the question: "Is the commanded total current (as represented by $I_{cmd}$ signal 316) less than the temperature-dependent total current limit (as represented by $I_{maxTD}$ signal 202)?" Moreover, when a "no" response is generated, discrete signals 322 are transmitted from function block 318, wherein condition D is not attained and attaining one of conditions A, B and/or C is possible.

FIG. 6 is a schematic diagram of an exemplary X-Y graph 400 illustrating the relationship between real power current command output ($I_{p0}$) signal 114 and reactive power current command output signal ($I_{q0}$) 112 within logic 301 (shown in FIG. 5). Graph 400 includes an ordinate (Y-Axis) 402 that represents a reactive power current component $I_q$. Graph 400 also includes an abscissa (X-Axis) 404 that represents a real power current component $I_p$. Graph 400 further includes a circle 406 that includes a circumference 408 and a radius 410 wherein radius 410 extends from origin 412 to circumference 408. Radius 410 represents the predetermined value for $I_{maxTD}$ signal 202.

Graph 400 also includes a total current command ($I_{cmd}$) line 414 that is representative of a value associated with total current command ($I_{cmd}$) signal 316 (shown in FIG. 5). Typically, the value of the electric current associated with total current command ($I_{cmd}$) signal 316 is less than the value associated with $I_{maxTD}$ signal 202. Therefore a length Of $I_{cmd}$ line 414 is typically less than radius 410. Extensions 416 of $I_{cmd}$ line 414 are illustrated with dotted lines to provide reference and perspective. Graph 400 further includes an X-axis component of $I_{cmd}$ line 414 that is represented by a real power current command ($I_{pcmd}$) line 418. $I_{pcmd}$ line 418 is representative of a value associated with real power current command ($I_{pcmd}$) output signal 114. Graph 400 also includes a Y-axis component of $I_{cmd}$ line 414 that is represented by a reactive power current command ($I_{qcmd}$) line 420. $I_{qcmd}$ line 420 is representative of a value associated with reactive power current command ($I_{qcmd}$) output signal 112. Lines 414, 418 and 420 are related to each other by the following algorithm:

$$I_{cmd} \text{ line } 414 = \sqrt{((I_{pcmd} \text{ line } 418)^2 + (I_{qcmd} \text{ line } 420)^2)} \qquad (7)$$

wherein such current values are related to each other as is apparent, reactive and real power as is known in the art. Moreover, lines 414, 418 and 420 are related to each other in a manner similar to the associated values of signals 316, 114 and 112 as expressed in equation (5) above.

Graph 400 further includes an angle of intersection, or angle θ 422, between X-axis 404 and line 414 wherein cos θ is equivalent to a power factor (neither shown) of the apparent power being transmitted to load 38 (shown in FIG. 2). FIG. 6 illustrates angle θ 422 as an acute angle. In the alternative embodiment, angle θ 422, and therefore the power factor, may have any value that facilitates operation of wind turbine generator 10 (shown in FIGS. 1 and 2) as discussed herein and as known in the art.

Graph 400 also includes real power current ($I_{p0}$) reference line 424 and reactive power current ($I_{q0}$) reference line 426. $I_{p0}$ reference line 424 intersects X-Axis 404 such that a particular value of $I_{pcmd}$ (commanded real power current) exists for a condition that includes line 414 (representing total commanded current, or $I_{cmd}$) equaling radius 410 (representative of $I_{maxTD}$) at a particular angle θ 422. Similarly, $I_{q0}$ reference line 426 intersects Y-Axis 402 such that a particular value of $I_{qcmd}$ (commanded reactive power current) exists for a condition that includes line 414 equaling radius 410 at a particular angle θ 422.

Graph 400 illustrates plurality of logic conditions 340, specifically, logic conditions A, B, C, and D (as described above) wherein such logic conditions are referenced to circumference 408, radius 410 (representative of $I_{maxTD}$), total current command ($I_{cmd}$) line 414, real power current command ($I_{pcmd}$) line 418 and reactive power current command ($I_{qcmd}$) line 420. For example, condition D is characterized by commanded total current (as represented by $I_{cmd}$ signal 316 and line 414) being less than the temperature-dependent total current limit (as represented by $I_{maxTD}$ signal 202 and radius 410). Therefore, condition D can exist anywhere within circle 406.

Graph 400 illustrates condition A referenced to the components of graph 400 discussed above. Specifically, condition A is attained when the commanded total current (as represented by $I_{cmd}$ signal 316 and line 414) is greater than the temperature-dependent current limit (as represented by $I_{maxTD}$ signal 202 and radius 410). Therefore, in condition A, line 414 extends along extension 416 beyond circumference 408 into a region defined between lines 424 and 426. Condition A also includes the additional elements that both the reactive and real power components desired to be transmitted to load 38 (as a function of $I_{maxTD}$) do not exceed the commanded reactive and real power components (neither shown).

Graph 400 also illustrates condition B referenced to the components of graph 400 discussed above. Specifically, condition B is attained when the commanded total current (as represented by $I_{cmd}$ signal 316 and line 414) is greater than the temperature-dependent current limit (as represented by $I_{maxTD}$ signal 202 and radius 410). Therefore, while the commanded total current exceeds the current limit, the desired reactive power current proportioned to the current limit (as represented by reactive power current ($I_{q0}$) signal 312 and not shown in FIG. 6) does not exceed the commanded reactive power current (as represented by reactive power current command output signal 112 and line 420). However, the desired real power current (as represented by real power current ($I_{p0}$)

signal 332 and not shown in FIG. 6) proportioned to the current limit does exceed the commanded real power current (as represented by real power current command output signal 114 and line 418). Therefore, since the ratio of the real power current value to reactive power current value has increased, the power factor has decreased and angle θ 422 is more acute and line 414 extends into a region defined between line 426 and X-Axis 404.

Graph 400 also illustrates condition C referenced to the components of graph 400 discussed above. Specifically, condition C is attained when the commanded total current (as represented by $I_{cmd}$ signal 316 and line 414) is greater than the temperature-dependent current limit (as represented by $I_{maxTD}$ signal 202 and radius 410). Therefore, while the commanded total current exceeds the current limit, the desired reactive power current proportioned to the current limit (as represented by reactive power current ($I_{q0}$) signal 312 and not shown in FIG. 6) does exceed the commanded reactive power current (as represented by reactive power current command output signal 112 and line 420). However, the desired real power current (as represented by real power current ($I_{p0}$) signal 332 and not shown in FIG. 6) proportioned to the current limit does not exceed the commanded real power current (as represented by real power current command output signal 114 and line 418). Therefore, since the ratio of the real power current value to reactive power current value has decreased, the power factor has increased and angle θ 422 is less acute and line 414 extends into a region defined between line 424 and Y-Axis 402.

Figure 7:
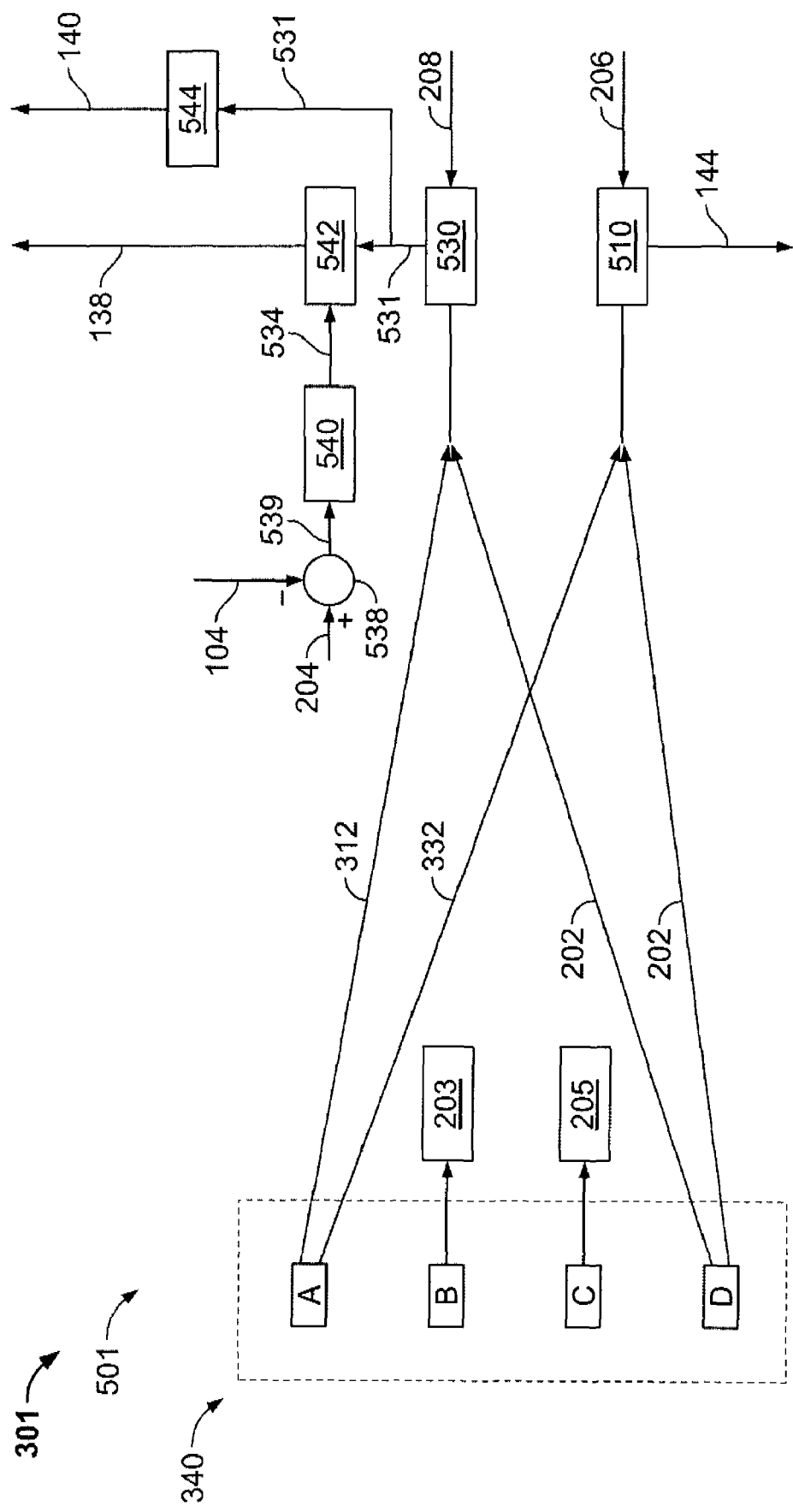
FIG. 7 is a block diagram of a portion of the alternative logic for priority selection that may be used with the logic shown in FIG. 5.

FIG. 7 is a block diagram of a portion 501 of alternative logic 301 (shown in FIG. 5) for priority selection. Logic portion 501 is configured to receive each of plurality of logic conditions 340 that include conditions A, B, C, and D that are determined as described above. Logic portion 501 includes a minimum function block 510 that is configured to receive signals 206 and/or 202 and compare input signals 332 and/or 202 and 206 and transmit the lesser of the two values as limit signal 144 to bounding function block 119 (shown in FIG. 3). Logic portion 501 also includes a minimum function block 530 that is configured to receive signal 208 and signals 312 and/or 202 and compare input signals 312 and/or 202 with signal 208 and transmit the lesser of the two values as a current limit signal 531.

Logic portion 501 further includes a summing junction 538 that is configured to receive signals 104 and 204. Summing junction 538 is also configured to generate a difference between converter voltage limit signal 204 and load-side voltage measurement input signal 104. The difference between signals 204 and 104 is generated by junction 538 and transmitted as a voltage difference signal 539 to a subtransient reactance function block 540. Function block 540 is configured with at least one resident algorithm to generate a voltage-based reactive power current limit signal 534. Signal 534 is at least partially based on voltage difference signal 539 and electrical properties of generator 24, converter 36, load 38 and conduits 33, 35, 37 and/or 39. Also, in this alternative embodiment, the algorithms within function block 540 use substantially static models of subtransient reactance. Alternatively, function block 540 is configured with at least one algorithm that computes signal 534 in any manner that facilitates operation of logic 301 as described herein including, but not limited to, transient reactance and steady-state reactance. Also, alternatively, the algorithms within function block 540 use substantially dynamic models of subtransient reactance, wherein signal 534 is substantially adaptive to conditions associated with wind turbine generator 10 and load 38.

Logic portion 501 also includes a minimum function block 542 that is configured to receive and compare signals 531 and 534 and transmit the lesser of the two values as limit signal 138 to the appropriate register (not shown) associated with total current reactive power component function block 136 (shown in FIG. 3). High-end reactive power current limit signal 138 facilitates limiting reactive power current command output signal 112, that is transmitted to the wind turbine controller, to a value the represents substantially the full range of remaining current-carrying capacity of converter 36. Therefore, logic portion 501 facilitates controlling the reactive power current component such that a potential to approach an upper range of current-carrying limits of generator 24, converter 36, load 38 and conduits 33, 35, 37 and/or 39 is mitigated.

Logic portion 501 is configured to generate low-end reactive power current limit signal 140. Therefore, logic portion 501 further includes a multiplication function block 544 that is configured to receive signal 531, multiply signal 531 by a constant value, and transmit signal 140. In the alternative embodiment, block 544 includes a constant of −1 and generates and transmits signal 140 to the appropriate register (not shown) associated with total current reactive power component function block 136 (shown in FIG. 3). Such computation as performed within function block 544 facilitates controlling the reactive power current component such that a potential to approach a lower range of current-carrying limits of generator 24, converter 36, load 38 and conduits 33, 35, 37 and/or 39 is mitigated. Computing, transmitting and using signals 138 and 140 as described herein facilitates controlling the reactive power current component for leading and lagging power factors as is know in the art.

In this alternative embodiment, function blocks 510 and 530, signal 531, summing junction 538, signal 539, function block 540, signal 534, function block 542 and function block 544 associated with logic portion 501 are identical to function blocks 210 and 230, signal 231, summing junctions 238, signal 239, function block 240, signal 234, function block 242 and function block 244 associated with logic blocks 203 and 205 (all shown in FIG. 4). Alternatively, function blocks 510 and 530, signal 531, summing junction 538, signal 539, function block 540, signal 534, function block 542 and function block 544 associated with logic portion 501 are configured and generated in any manner that facilitates operation of alternative logic 301 as described herein.

In operation, when condition A is determined, real power current ($I_{p0}$) signal 332 is transmitted to minimum function block 510. Function block 510 compares input signals 322 and 206 and transmits the lesser of the two values as limit signal 144 to bounding function block 119 (shown in FIG. 3). Since condition A is at least partially defined by the commanded total current being greater than the current limit, having a value that represents a fraction of the current limit (or a lesser value) as the upper boundary on the real current demand facilitates maintaining wind turbine generator 10 current generation within predetermined parameters.

Moreover, reactive power current ($I_{q0}$) signal 312 is transmitted to minimum function block 530. Minimum function block 530 receives and compares input signal 312 and hard reactive power current limit signal 208. Function block transmits the lesser of the two values as current limit signal 531 to function blocks 542 and 544.

Summing junction 538 receives signals 104 and 204 and generates a difference between converter voltage limit signal 204 and load-side voltage measurement input signal 104. The difference between signals 204 and 104 is generated by junction 538 and transmitted as voltage difference signal 539 to subtransient reactance function block 540. Function block 540 generates a voltage-based reactive power current limit signal 534. Signal 534 is at least partially based on voltage difference signal 539 and electrical properties of generator 24, converter 36, load 38 and conduits 33, 35, 37 and/or 39 (all shown in FIG. 2).

Minimum function block 542 receives and compares signals 532 and 534 and transmits the lesser of the two values as high-end reactive power current limit signal 138 to the appropriate register (not shown) associated with total current reactive power component function block 136. Since condition A is at least partially defined by the commanded total current being greater than the current limit, having a value that represents a fraction of the current limit (or a lesser value) as the upper boundary on the reactive current demand facilitates maintaining wind turbine generator 10 current generation within predetermined parameters.

Multiplication function block 244 receives signal 232, multiplies signal 232 by a constant value, and generates and transmits low-end reactive power current limit signal 140. Block 244 includes a constant of −1 and generates and transmits signal 140 to the appropriate register (not shown) associated with total current reactive power component function block 136. Since condition A is at least partially defined by the commanded total current being greater than the current limit, having a value that represents a fraction of the current limit (or a lesser value) as the lower boundary on the reactive current demand facilitates maintaining wind turbine generator 10 current generation within predetermined parameters.

Also, in operation, when condition D is determined, temperature-dependent current limit ($I_{maxTD}$) signal 202 is transmitted to function blocks 510 and 530 as compared to signals 332 and 312, respectively, when condition A is determined. Function block 510 receives and compares signals 206 and 202 and transmits the lesser of the two signals as signal 144. Function block 530 receives and compares signals 202 and 208 and transmits the lesser of the two signals as signal 531 to be used within the remaining logic as described above in a manner similar to that for condition A. Since condition D is at least partially defined by the total current demand being less than the current limit, having a value that represents the current limit (or a lesser value) as the upper boundary on real power current demand and an upper and lower boundary on the reactive current demand facilitates maintaining wind turbine generator 10 current generation within predetermined parameters.

Further, in operation, when condition B is determined, logic block 203 (shown in FIG. 4) is selected. When condition C is determined, logic block 205 (shown in FIG. 4) is selected.

The method and apparatus for controlling electric current in a wind turbine generator as described herein facilitate operation of such wind turbine generator. More specifically, the electric current functional logic as described above facilitates an efficient and effective electrical generation control system. Also, the robust, control system facilitates generator production efficiency and effectiveness. Such control system also facilitates wind turbine generator reliability and reducing wind turbine generator outages by facilitating maintenance of an operational margin between generated currents and equipment current limits.

Exemplary embodiments of wind turbine electrical control systems as associated with wind turbine generators are described above in detail. The methods, apparatus and systems are not limited to the specific embodiments described herein nor to the specific illustrated wind turbine generators.

While the invention has been described in terms of various specific embodiments, those skilled in the art will recognize that the invention can be practiced with modification within the spirit and scope of the claims.

What is claimed is:

1. A method for determining electric currents for an electrical machine, said method comprising:
generating a first real power current demand signal and a first reactive power current demand signal; and
determining at least one of a second real power current demand signal and a second reactive power current demand signal by:
prioritizing at least one of a second real power current demand signal over a second reactive power current demand signal and the second reactive power current demand signal over the second real power current demand signal; and
comparing at least one of the first real power current demand signal and first reactive power current demand signal to at least one electrical machine current limit signal.

2. A method in accordance with claim 1 wherein prioritizing at least one of the second real power current demand signal over the second reactive power current demand signal and the second reactive power current demand signal over the second real power current demand signal comprises selecting at least one of a real power current demand signal functional logic block and a reactive power current demand signal functional logic block.

3. A method in accordance with claim 2 wherein selecting at least one of the real power current demand signal functional logic block and the reactive power current demand signal functional logic block comprises at least one of:
shifting at least one discrete switch configured to shift between the real power current demand signal functional logic block and the reactive power current demand signal functional logic block substantially using operator prerogative; and
using a substantially automated selection logic block configured to shift between at least the real power current demand signal functional logic block and the reactive power current demand signal functional logic block.

4. A method in accordance with claim 3 wherein using the substantially automated selection logic block comprises:
using at least one total current demand signal algorithm to calculate a total current demand signal, the at least one total current demand signal algorithm configured to receive the first real power current demand signal and the first reactive power current demand signal;
using at least one first comparison algorithm to compare the total current demand signal and the at least one electrical machine current limit signal, thereby generating a first result signal;
using at least one reactive power current algorithm to calculate a reactive power current signal, the at least one reactive power current algorithm using at least one of a reactive power signal, an apparent power signal, and the at least one electrical machine current limit signal;
using at least one second comparison algorithm to compare an absolute value of the reactive power current signal and an absolute value of the total current demand signal, thereby generating a second result signal;
using at least one real power current algorithm to calculate a real power current signal, the at least one real power current signal algorithm using at least one of a real power signal, an apparent power signal, and the at least one electrical machine current limit signal;

using at least one third comparison algorithm to compare the real power current signal and the total current demand signal, thereby generating a third result signal;

using at least one of the first, second and third result signals to modulate at least one of:
- the real power current demand signal within a first band and a reactive power current demand signal within a second band, said first band greater than said second band; and
- the reactive power current demand signal within a third band and a real power current demand signal within a fourth band, said third band greater than said fourth band.

5. A method in accordance with claim 1 wherein determining a second real power current demand signal comprises determining an upper real power current limit signal using at least one of:
- the first reactive power current demand signal; and
- the at least one electrical machine current limit signal.

6. A method in accordance with claim 5 wherein determining an upper real power current limit signal using the at least one electrical machine current limit signal comprises comparing the at least one electrical machine current limit signal with at least one of the first real power current demand signal and the first reactive power current demand signal using at least one of the following algorithms:
- the operating upper real power current limit signal=$\sqrt{((\text{the at least one electrical machine current limit signal})^2-(\text{the first real power current demand signal})^2)}$; and
- the operating upper real power current limit signal=$\sqrt{((\text{the at least one electrical machine current limit signal})^2-(\text{the first reactive power current demand signal})^2)}$.

7. A method in accordance with claim 1 wherein determining a second reactive power current demand signal comprises determining at least one of an upper reactive power current limit signal and a lower reactive power current limit signal using at least one of:
- at least one electrical machine voltage;
- the at least one electrical machine current limit signal;
- at least one electrical machine voltage limit signal;
- the first reactive power current demand signal; and
- the first real power current demand signal.

8. A method in accordance with claim 7 wherein determining at least one of an upper reactive power current limit signal and a lower reactive power current limit signal using the at least one electrical machine current limit signal comprises comparing the at least one electrical machine current limit signal with the real power current demand signal using at least the following algorithm:
- the operating upper real power current limit signal=$\sqrt{((\text{the at least one electrical machine current limit signal})^2-(\text{the first real power current demand signal})^2)}$.

9. A control system for determining electric currents for an electrical machine comprising:
- at least one real power current demand signal functional logic block configured to modulate a real power current demand signal within a first band and modulate a reactive power current demand signal within a second band, wherein said first band is greater than said second band;
- at least one reactive power current functional logic block configured to modulate a reactive power current demand signal within a third band and modulate a real power current demand signal within a fourth band, wherein said third band is greater than said fourth band; and
- at least one selection mechanism configured to select at least one of said real power current demand signal functional logic block and said reactive power current demand signal functional logic block.

10. A control system in accordance with claim 9 wherein said at least one selection mechanism comprises at least one of:
- at least one discrete switch, said switch configured to shift between selecting said real power current demand signal functional logic block and said reactive power current demand signal functional logic block substantially using operator prerogative; and
- at least one substantially automated selection logic block configured to shift between at least said real power current demand signal functional logic block and said reactive power current demand signal functional logic block.

11. A control system in accordance with claim 10 wherein said at least one substantially automated selection logic block further comprises:
- at least one total current demand signal algorithm configured to calculate a total current demand signal;
- at least one first comparison algorithm configured to compare said total current demand signal and at least one electrical machine current limit signal;
- at least one reactive power current algorithm configured to calculate a reactive power current signal;
- at least one second comparison algorithm configured to compare an absolute value of said reactive power current signal and an absolute value of said total current demand signal;
- at least one real power current algorithm configured to calculate a real power current signal; and
- at least one third comparison algorithm configured to compare said real power current signal and said total current demand signal.

12. A control system in accordance with claim 11 wherein said at least one electrical machine current limit signal comprises a value substantially equivalent to at least one of:
- at least one electric machine temperature-dependent current limit;
- at least one hard real power current limit;
- at least one hard reactive power current limit; and
- at least one electric machine voltage limit.

13. A control system in accordance with claim 9 further comprising:
- at least one reactive power current demand signal bounding function configured to receive at least one bounding signal from at least one of:
  - said at least one real power current demand signal functional logic block; and
  - said at least one reactive power current demand signal functional logic block.

14. A control system in accordance with claim 9 further comprising:
- at least one real power current demand signal bounding function configured to receive at least one bounding signal from at least one of:
  - said at least one real power current demand signal functional logic block; and
  - said at least one reactive power current demand signal functional logic block.

15. A wind turbine generator comprising:
- a rotor comprising a hub, at least one rotor blade coupled to said hub, and a rotor shaft coupled to said hub for rotation therewith;
- at least one electrical generator coupled to said rotor shaft;
- at least one frequency converter electrically coupled to said electrical generator; and a control system for determining electric currents in at least one of said at least one electrical generator and said at least one frequency converter, said control system comprising at least one real power current demand signal functional logic block, at least one reactive power current functional logic block, and at least one selection mechanism, said at least one real power current demand signal functional logic block configured to modulate a real power current demand signal within a first band and modulate a reactive power current demand signal within a second band, wherein said first band is greater than said second band, said at least one reactive power current functional logic block configured to modulate a reactive power current demand signal within a third band and modulate a real power current demand signal within a fourth band, wherein said third band is greater than said fourth band, said at least one selection mechanism configured to select at least one of said real power current demand signal functional logic block and said reactive power current demand signal functional logic block.

16. A wind turbine generator in accordance with claim 15 wherein said at least one selection mechanism comprises at least one of:
   at least one discrete switch, said switch configured to shift between selecting said real power current demand signal functional logic block and said reactive power current demand signal functional logic block substantially using operator prerogative; and
   at least one substantially automated selection logic block configured to shift between at least said real power current demand signal functional logic block and said reactive power current demand signal functional logic block.

17. A wind turbine generator in accordance with claim 16 wherein said at least one substantially automated selection logic block further comprises:
   at least one total current demand signal algorithm configured to calculate a total current demand signal;
   at least one first comparison algorithm configured to compare said total current demand signal and at least one electrical machine current limit signal;
   at least one reactive power current algorithm configured to calculate a reactive power current signal;
   at least one second comparison algorithm configured to compare an absolute value of said reactive power current signal and an absolute value of said total current demand signal;
   at least one real power current algorithm configured to calculate a real power current signal; and
   at least one third comparison algorithm configured to compare said real power current signal and said total current demand signal.

18. A wind turbine generator in accordance with claim 17 wherein said at least one electrical machine current limit signal comprises a value substantially equivalent to at least one of:
   at least one electric machine temperature-dependent current limit;
   at least one hard real power current limit;
   at least one hard reactive power current limit; and
   at least one electric machine voltage limit.

19. A wind turbine generator in accordance with claim 15 further comprising:
   at least one reactive power current demand signal bounding function configured to receive at least one bounding signal from at least one of:
      said at least one real power current demand signal functional logic block; and
      said at least one reactive power current demand signal functional logic block.

20. A wind turbine generator in accordance with claim 15 further comprising:
   at least one real power current demand signal bounding function configured to receive at least one bounding signal from at least one of:
      said at least one real power current demand signal functional logic block; and
      said at least one reactive power current demand signal functional logic block.

* * * * *